Figure 1:
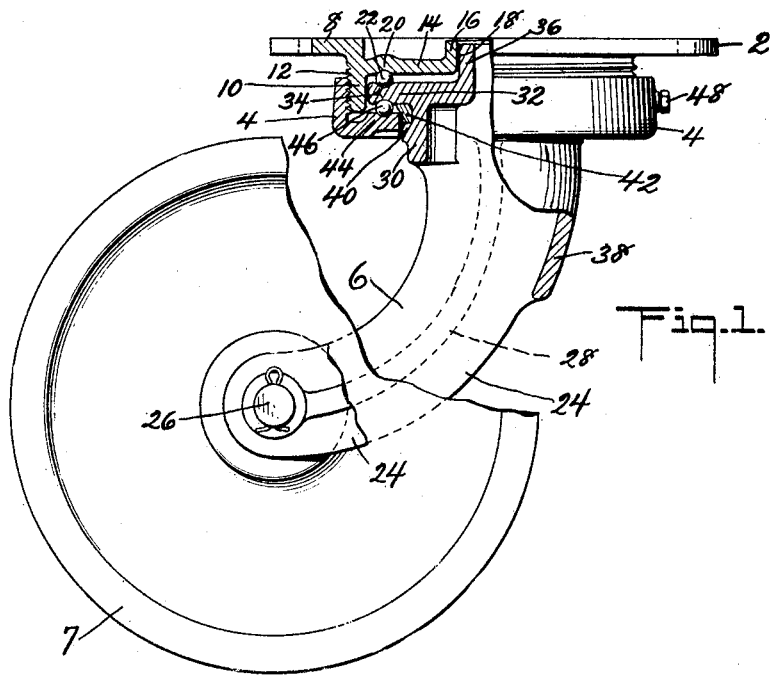

Sept. 10, 1929.  A. KASSLER ET AL  1,727,716
CASTER
Filed Feb. 8, 1928

INVENTORS
Adolph Kassler and
Victor Willoughby
BY F. H. Gibbs
ATTORNEY

Patented Sept. 10, 1929.

1,727,716

UNITED STATES PATENT OFFICE.

ADOLPH KASSLER, OF NEW YORK, N. Y., AND VICTOR WILLOUGHBY, OF RIDGE-WOOD, NEW JERSEY, ASSIGNORS TO AMERICAN CAR AND FOUNDRY COMPANY, OF NEW YORK, N. Y., A CORPORATION OF NEW JERSEY.

CASTER.

Application filed February 8, 1928. Serial No. 252,788.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

Figure 2:
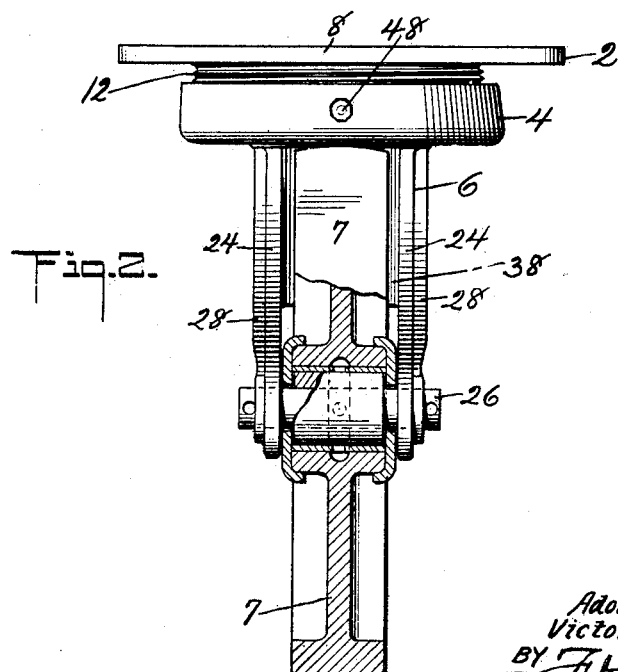

In the drawings:

Figure 1 is a side elevation, partly in section, of the caster of the present invention, and Fig. 2 is a front elevation of the device, certain parts being broken away.

The invention relates to casters of the swivel type and one of the main objects of the invention is to facilitate swiveling by preventing binding and friction between contacting surfaces of the wheel bearing part and the attaching members.

Another object of the invention is the provision of a ball bearing caster formed of connected parts which may be easily and quickly assembled and disassembled.

A further object of the invention is the provision of an extremely strong and durable caster which is inexpensive to manufacture and which consists of few parts.

Other objects and advantages of this invention will be apparent from the following description considered with the accompanying drawings in which the caster is shown as comprising in the main an attaching plate indicated generally at 2, a retainer element indicated generally at 4 and a caster leg indicated at 6, the latter supporting the wheel 7.

The attaching plate 2 comprises a portion 8 by which the same may be secured, a depending annular flange 10 which is exteriorly threaded as at 12, and an integral inwardly extending web 14, the marginal edge of which is upwardly turned to form a circular flange 16 the inner surface 18 of which is machined and defines a guideway.

A circular raceway 20 is provided in the web 14 in which anti-friction bearing members, such as the balls 22, are adapted to work.

The caster leg 6 is preferably of the type shown in the drawings and comprises spaced members 24 between the lower ends of which the wheel 7 is mounted on an axle 26. The members 24 are each provided with a reinforcing rib 28 and the upper portions of said members are merged into a head 30 provided with an annular shoulder 32 having opposed raceways 34 formed therein the upper one of which the before-mentioned bearing members 22 are adapted to work. The balls 22 are mounted between the shoulder 32 and the web 14, the same working in the raceways formed in said web and shoulder, and the caster head is provided with a central projection or guide 36 which is in the form of an annular shoulder and which is positioned within the guideway defined by the before-mentioned flange 16. The outer surface of the shoulder is machined to work nicely against the machined inner surface of the guideway 16 in the event of contact between said surfaces.

The spaced members 24 form the caster leg as before-mentioned, and said leg is reinforced by a rear connecting plate 38 which is formed integral with the caster head, as clearly shown in Fig. 1, and said head is provided with an annular rib 40 arranged just beneath the shoulder 32 which defines a recess within which is arranged a suitable packing 42.

A retainer is provided, the same being designated generally as 4, as before-mentioned, and being secured to and adjustable on the depending flange 10 of the attaching plate. This retainer includes an inwardly extending portion 44 which underlies the shoulder 32 and which supports the anti-friction bearing members 46, the latter being adapted to work in raceways formed in the underlying portion of the retainer and in the lower face of the shoulder 32. For securing the retainer in its adjusted position on the flange 10, a set screw 48 is provided, as clearly shown in the drawings.

When the device is assembled as shown in Fig. 1, it will be apparent that the caster leg is firmly though anti-frictionally mounted within the recess defined by the depending flange 10, and further, the anti-friction bearing members 22 will serve to support the caster leg and eliminate the friction of the load. It will also be apparent that the retainer 4 may be adjusted on the flange 10 to regulate or adjust the assembled connected relation of the attaching plate and the caster leg, at the shoulder portion of the latter.

The machined portions of the circular flange 16 and the guide 36 provide for easy movement between the several parts of the caster, notwithstanding any possible loose arrangement of the anti-friction bearing members with respect to the raceways, and further, it will be apparent that should there be any tendency of the caster leg to tilt with respect to the attaching plate, the same will be counteracted by the engagement of said machined surfaces. In use, the device is preferably packed with grease or other lubricant which is retained against leakage by the packing heretofore mentioned.

What is claimed is:

1. A swivel caster comprising an attaching plate, a depending annular flange formed therewith, an upwardly extending circumferential guide formed with the plate, a caster leg having its upper end arranged in said guide, a supporting shoulder at the upper end of the leg arranged beneath the attaching plate, anti-friction bearings between said shoulder and plate, and a retainer adjustably secured to the flange and underlying the supporting shoulder.

2. A swivel caster comprising an attaching plate having a depending annular flange and an upwardly extending circumferential guide, a caster leg provided with an annular shoulder at its upper end arranged under the attaching plate and with an annular flange arranged in said guide, anti-friction bearings supporting the caster leg, and a retainer underlying the annular shoulder and provided with a circumferential attaching flange adjustably secured to the annular flange.

3. A swivel caster comprising a plate having a depending attaching flange and an inwardly extending web defining a guide, a caster leg, a head formed with said leg and including a supporting shoulder arranged under the web and an upstanding circular flange positioned in said guide, anti-friction bearing members mounted on the shoulder for supporting the plate, a retainer adjustably secured to the depending flange and underlying the shoulder, and anti-friction bearings between the retainer and said shoulder.

4. A swivel caster comprising an attaching plate having a depending annular flange and a central circumferential guideway, a caster leg, a head formed on said caster leg and comprising an annular shoulder arranged under the attaching plate and a circumferential flange positioned in said guideway, anti-friction bearing members between said plate and shoulder, a retainer adjustably secured to the flange and underlying the shoulder, anti-friction bearings between the retainer and shoulder, and a packing secured to the head adjacent the end of the retainer.

In witness whereof we have hereunto set our hands.

ADOLPH KASSLER.
VICTOR WILLOUGHBY.